Oct. 21, 1941.    J. W. FOLEY    2,259,881
BALL BEARING
Filed Dec. 9, 1940
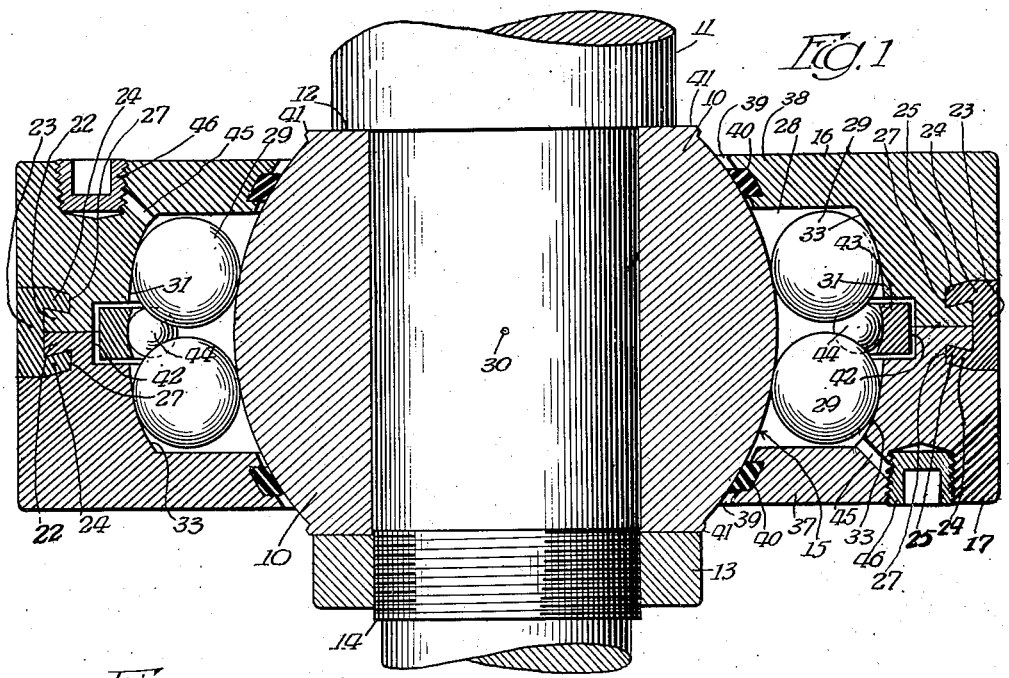
Fig.1
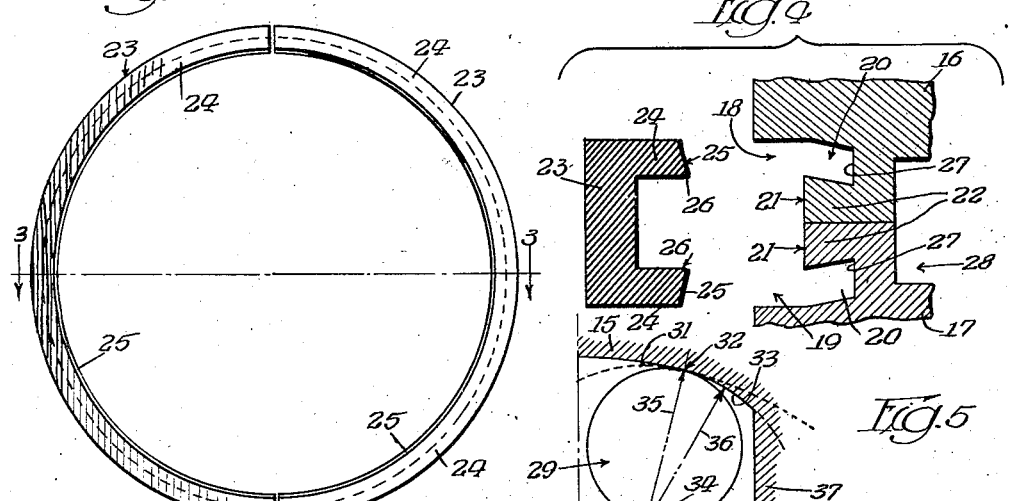
Fig.2   Fig.4
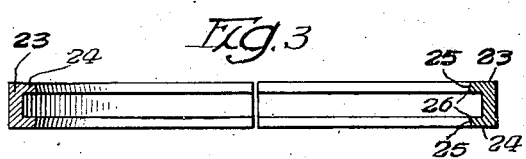
Fig.3
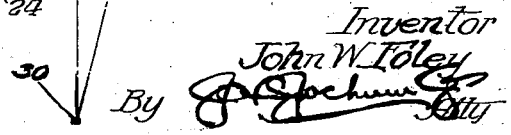
Inventor
John W. Foley
By Patented Oct. 21, 1941

2,259,881

UNITED STATES PATENT OFFICE 2,259,881

BALL BEARING

John W. Foley, Chicago, Ill.

Application December 9, 1940, Serial No. 369,307

8 Claims. (Cl. 308—194)

This invention relates to improvements in ball bearings and one of the objects of the same is to improve and simplify the construction of such a bearing and to provide an improved self-alining bearing in which the load carrying balls have a single-point contact against the respective bearing surfaces of the raceway, and in which the balls will be completely housed and concealed.

A further object is to provide improved means for maintaining the balls in proper position.

A further object is to provide in a ball bearing improved means whereby the space occupied by the balls may be provided with a lubricant and may be readily cleaned, without the necessity of dismantling the parts of the bearing.

A further object is to provide an improved bearing having an outer annular sectional ring member against which the balls have a bearing and improved means for securing the said sections together.

A further object is to provide improved means for protecting the balls, and improved means for preventing displacement of the bearing with relation to the shaft which operates therein, when the bearing and shaft assume angular positions one with relation to the other.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a longitudinal sectional view of a bearing of this character constructed in accordance with the principles of this invention.

Figure 2 is a side elevation of the securing means for the sections of the outer bearing member.

Figure 3 is a detail sectional view taken on line 3—3 Figure 2.

Figure 4 is an enlarged detail fragmentary view of a portion of the sections of the outer bearing member and the securing member therefor, with the parts separated.

Figure 5 is a diagrammatic view on an enlarged scale illustrating the manner in which the surface of the outer bearing member is produced.

Referring more particularly to the drawing, the numeral 10 designates an inner bearing member which in the present exemplification of this invention is shown mounted upon the end of a shaft 11, the shaft being provided with a shoulder 12 against which the bearing member 10 abuts and this member is held in position preferably by means of a nut or collar 13 engaging a threaded portion 14 of the shaft 12.

The outer periphery of this bearing member 10 is convexed, as at 15, in a direction extending lengthwise of the axis of the shaft 11. The outer bearing member is of sectional construction comprising two sections 16—17. The sections are provided respectively with recesses 18—19 that open through the outer periphery of the respective sections and also through the lateral face of the section.

Another recess 20 is provided in each of the sections and these recesses 20 communicate with the respective recesses 18—19 and extend below the bottoms thereof, the recesses 20 being inclined to the bottoms 21 of the recesses 18—19 and in a direction toward each other to provide, when the sections 16—17 are assembled, a projection 22 that is disposed within the recesses 18—19 terminating short of the top thereof and also spaced from the sides of the recesses.

The projection 22 is of a dovetail configuration as shown more clearly in Figure 4 of the drawing.

The sections 16—17 are secured together preferably by semi-circular members 23 which are of a channel formation providing side walls 24 and the extremities of these walls 24 are inclined or beveled, as at 25, while the bottoms of the recesses 20 are preferably straight.

The sections 16 are secured together by inserting the channel members 23 into the respective recesses 18—19 so that the walls 24 will enter the respective recesses 20 and by forcing the channel member into the recesses 18—19 the points 26 of the extremities 25 will engage the bottoms 27 of the recesses 20, and the side walls 24 of the channel members 23 will be deflected, as shown more clearly in Figure 1. That is, the side walls will be forced to conform to the shape of the recesses 20 and will be deflected against the dovetail projection 22 to not only draw the sections 16—17 together but to lock them against separation and also to lock the channel member 23 against displacement with respect to these sections.

The inner face of the outer ring bearing member thus formed is shaped to provide a housing or recess 28 for the reception of balls 29 so that the balls will contact the periphery of the inner bearing member 10 and also the bottom wall of the housing or recess 28. The bearing surface on the inner face of the outer ring member 16 is formed on an arc described from the diametric center 30 of inner member, and such surface 31 is tangent to the periphery of the ball 29 as indicated at 32 so that the ball will have a single-point contact with such surface; the portion 33 of the inner surface of the outer ring member in proximity to the balls beyond the tangent point contact 32 is formed on an arc described from a point 34 in alinement with the diameter of the ball intersecting the tangent contact point, the latter being indicated by the reference numeral 35 and the radius on which the surface 33 is described being indicated by the reference numeral 36.

The side walls 37—38 of the recess 28 terminate in close proximity to the periphery of the inner bearing member 10 and the space 39 between the end of the wall and the periphery of the inner bearing member 10 decreases in size from the outer surface of the walls 37 inwardly, suitable packing 40 being provided to prevent the entrance of foreign matter.

In order to prevent displacement of the outer bearing ring with respect to the shaft and the inner bearing member 10, there may be provided stops 41 on the inner bearing member 10.

Within a recess 42 in the outer bearing member there is provided a floating annular bearing member 43 against the curved inner surface of which balls 44 contact, and these balls 44 are arranged between two series of balls 29 and have contact with the balls 29.

These balls 44 serve to maintain the balls 29 separated and in proper relative position. The stress of the bearing is exerted at the tangent point of contact 32.

With this construction it will be manifest that the balls 29 and 44 are completely housed and concealed within the outer bearing member and in order to lubricate the same, lubrication openings 45 may be provided which are closed by means of suitable closures 46. By removing these closures the lubricant can be forced into the bearing. These openings 45 are arranged preferably on opposite sides of the bearing and out of alinement so that when it is desired to clean the bearing the closures 46 may be removed and a cleansing fluid may be forced into the bearing through one of the openings 45 and the same will flow out of the other opening 45 carrying with it the foreign matter.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. In a ball bearing, an inner bearing member, the outer periphery of which is convexed in the direction lengthwise of the axis thereof, an outer sectional annular bearing member, means for holding said sections together, the inner bearing surface of said outer member being concaved, a series of laterally spaced balls between and contacting the surfaces of the outer and inner members, and an outer floating bearing member, balls contacting said floating member and the adjacent first said balls, the bearing surface of the outer bearing member being tangent to the periphery of the first said balls and having a single point contact therewith, the portions of the bearing surface of the outer bearing member for each of the first said balls beyond the tangential contact point being formed on an arc described from a point in alinement with the diameter of said balls intersecting said tangential contact point, whereby said balls will be maintained against lateral displacement.

2. In a ball bearing, an inner bearing member, the outer periphery of which is convexed in the direction lengthwise of the axis thereof, an outer sectional annular bearing member, means for holding said sections together, the inner bearing surface of said outer member being concaved, a series of laterally spaced balls between and contacting the surfaces of the outer and inner members, and an outer floating bearing member, balls contacting said floating member and the adjacent first said balls, the bearing surface of the outer bearing member being tangent to the periphery of the first said balls and having a single point contact therewith, the portions of the bearing surface of the outer bearing member for each of the first said balls beyond the tangential contact point being formed on an arc described from a point in alinement with the diameter of said balls intersecting said tangential contact point, whereby said balls will be maintained against lateral displacement, the said outer sectional annular bearing member being shaped to form a housing for said balls the walls of which terminate adjacent the said inner bearing member.

3. In a ball bearing, an inner bearing member, the outer periphery of which is convexed in the direction lengthwise of the axis thereof, an outer sectional annular bearing member, means for holding said sections together, the inner bearing surface of said outer member being concaved, a series of laterally spaced balls between and contacting the surfaces of the outer and inner members, an outer floating bearing member, balls contacting said floating member and the adjacent first said balls, the bearing surface of the outer bearing member being tangent to the periphery of the first said balls and having a single point contact therewith, the portions of the bearing surface of the outer bearing member for each of the first said balls beyond the tangential contact point being formed on an arc described from a point in alinement with the diameter of said balls intersecting said tangential contact point, whereby said balls will be maintained against lateral displacement, the said outer sectional annular bearing member being shaped to form a housing for said balls the walls of which terminate adjacent the said inner bearing member, and packing material between the ends of the said walls and the inner bearing member.

4. In a ball bearing, an inner bearing member, the outer periphery of which is convexed in the direction lengthwise of the axis thereof, an outer sectional annular bearing member, means for holding said sections together, the inner bearing surface of said outer member being concaved, a series of laterally spaced balls between and contacting the surfaces of the outer and inner members, an outer floating bearing member, balls contacting said floating member and the adjacent first said balls, the bearing surface of the outer bearing member being tangent to the periphery of the first said balls and having a single point contact therewith, the portions of the bearing surface of the outer bearing member for each of the first said balls beyond the tangential contact point being formed on an arc described from a point in alinement with the diameter of said balls intersecting said tangential contact point, whereby said balls will be maintained against lateral displacement, the said outer sectional annular bearing member being shaped to form a housing for said balls the walls of which terminate adjacent the said inner bearing member, and a stop on the inner bearing member for limiting the angular displacement of the inner bearing member with respect to the outer bearing member.

5. In a bearing of the character described, inner and outer bearing members, balls disposed between and engaging said members, the outer bearing member being of sectional construction, said sections abutting each other, the periphery of the outer member being provided with an annular recess, one wall of which is provided with a projection increasing in width from its base and terminating short of the top of the recess, and spaced from the side walls of the recess, a channel shaped member seated in the recess, and flush with the periphery of the outer bearing member, the walls of said channel member being deflected to engage the sides of the said projecting portion whereby to lock the sections of the bearing member together and the channel member in position.

6. In a bearing of the character described, inner and outer bearing members, balls disposed between and engaging said members, the outer bearing member being of sectional construction, said sections abutting each other, the periphery of the outer member being provided with an annular recess, one wall of which is provided with a projection increasing in width from its base and terminating short of the top of the recess, and spaced from the side walls of the recess, a channel shaped member seated in the recess and flush with the periphery of the outer bearing member, the walls of said channel member being deflected to engage the sides of the said projecting portion whereby to lock the sections of the bearing member together and the channel member in position, a portion of said projection being formed in each of the sections of said outer bearing member, and said channel member spanning the contacting faces of said outer bearing member.

7. In a ball bearing an inner bearing member, an outer annular bearing member, said outer member comprising two annular sections arranged in abutting relation, each of said sections being formed with a peripheral recess opening through one lateral face and the periphery, a recess extending beyond the bottom of the first said recess and arranged at an angle to the remaining portion of said bottom and spaced from the lateral face of the respective member section whereby to form a projection within the first said recess when the member sections are assembled, said projection being of a dovetail shape, a channel member disposed in the first said recess to span the abutting faces of the sections, the sides of said channel member being disposed in the angular disposed recesses and deflected against the wall of said projection whereby to lock the sections together, and balls disposed between the said bearing members.

8. In a ball bearing an inner bearing member, an outer annular bearing member, said outer member comprising two annular sections arranged in abutting relation, each of said sections being formed with a peripheral recess opening through one lateral face and the periphery, a recess extending beyond the bottom of the first said recess and arranged at an angle to the remaining portion of said bottom and spaced from the lateral face of the respective member section whereby to form a projection within the first said recess when the member sections are assembled, said projection being of a dovetail shape, a channel member disposed in the first said recess to span the abutting faces of the sections, the sides of said channel member being disposed in the angular disposed recesses and deflected against the wall of said projection whereby to lock the sections together, and balls disposed between the said bearing members, the periphery of said channel member being flush with the outer periphery of the said outer bearing member.

JOHN W. FOLEY.